United States Patent [19]

Sugimura et al.

[11] Patent Number: 4,843,915
[45] Date of Patent: Jul. 4, 1989

[54] ELECTRONIC CONTROL SYSTEM FOR AUTOMATIC VEHICLE TRANSMISSION WITH MEANS FOR DETERMINING ABNORMAL OPERATION OF VEHICLE SPEED SENSOR

[75] Inventors: Toshiya Sugimura, Numazu; Hiroshi Yoshimura, Hiroshima, both of Japan

[73] Assignee: Isuzu Motors Limited, Tokyo, Japan

[21] Appl. No.: 208,671

[22] Filed: Jun. 20, 1988

[30] Foreign Application Priority Data

Jun. 20, 1987 [JP] Japan ................ 62-152430

[51] Int. Cl.⁴ ............................................. B60K 41/06
[52] U.S. Cl. ......................................... 74/862; 74/866
[58] Field of Search ................ 74/861, 864, 865, 866, 74/862

[56] References Cited

U.S. PATENT DOCUMENTS

| 4,393,732 | 7/1983 | Suzuki et al. ............... 74/866 |
| 4,635,508 | 1/1987 | Tatsumi ..................... 74/861 X |
| 4,779,490 | 10/1988 | Milunas et al. .............. 74/862 |

FOREIGN PATENT DOCUMENTS

| 56-49447 | 5/1981 | Japan ....................... 74/866 |
| 56-49450 | 5/1981 | Japan ....................... 74/866 |
| 57-173646 | 10/1982 | Japan ....................... 74/866 |
| 57-177449 | 11/1982 | Japan ....................... 74/866 |
| 2084673 | 4/1982 | United Kingdom ............. 74/864 |

*Primary Examiner*—Dwight G. Diehl
*Attorney, Agent, or Firm*—Staas & Halsey

[57] ABSTRACT

An electronic control system for controlling an automatic transmission mounted on a vehicle determines whether a vehicle speed sensor is abnormal or not when the transmission gears are in a neutral gear position. If the vehicle speed sensor is abnormal, then vehicle speed data immediately before the vehicle speed sensor becomes abnormal is stored, and a gear position is determined based on the stored vehicle speed data for a predetermined period of time after the transmission gears are shifted from the neutral gear position to another gear position.

2 Claims, 7 Drawing Sheets

| VARIABLES | CONTENTS |
|---|---|
| SPD:REAL | INTERNAL CONTROL VALUE (km/h) CONVERTED FROM OUTPUT PULSES FROM VEHICLE SPEED SENSOR |
| SPD | WHEN VEHICLE SPEED SENSOR IS NORMAL, VALUE PRODUCED BY EFFECTING FILTERRING PROCESS ON SPD : READ. WHEN VEHICLE SPEED SENSOR IS ABNORMAL, VALUE WHICH IS BACKED UP. (km/h) |
| SPEED | BUFFER FOR SPD |
| GEAR | TARGET GEAR POSITION |
| ACCEL | VALUE PRODUCED BY CONVERTING OUTPUT FROM ACCELERATOR SENSOR THROUGH A/D CONVERSION |

FIG. 8

$t_0$: TIME WHEN GEARS ARE IN NEUTRAL POSITION
$t_{10}$: TIME WHEN VEHICLE SPEED SENSOR FAILS
$t_{11}$: TIME WHEN SPD BECOMES ZERO
$t_2$: TIME WHEN A GEAR SHIFT IS EFFECTED FROM NEUTRAL GEAR POSITION

ELECTRONIC CONTROL SYSTEM FOR AUTOMATIC VEHICLE TRANSMISSION WITH MEANS FOR DETERMINING ABNORMAL OPERATION OF VEHICLE SPEED SENSOR

BACKGROUND OF THE INVENTION

The present invention relates to an electronic control system for an automatic vehicle transmission, and more particularly to an electronic control system for controlling a vehicle transmission based on a vehicle speed, an amount of depression of an accelerator pedal, or the like.

Figure 4:
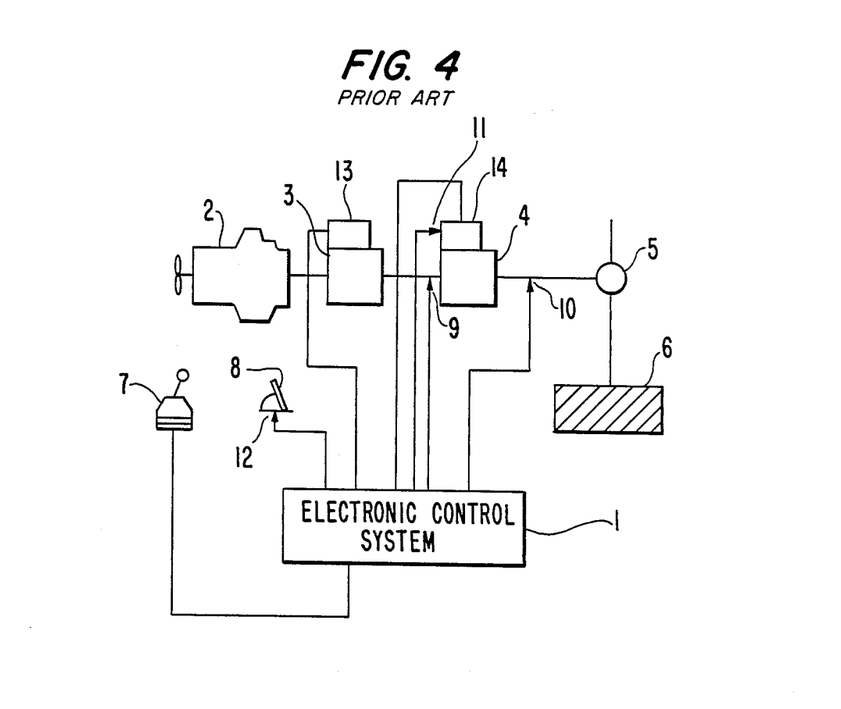
FIG. 4 a schematic view of an automobile incorporating electronic control system.

FIG. 4 of the accompanying drawings schematically shows an automobile incorporating a conventional electronic control system 1 for automatically controlling a vehicle transmission.

Denoted in FIG. 4 at 2 is an engine, 3 a clutch, 4 a transmission, 5 a final drive unit, 6 a wheel, 7 a selector lever, and 8 an accelerator pedal.

Designated at 9 is an input shaft sensor for detecting the rotational speed of an input shaft of the transmission 4, 10 a vehicle speed sensor for detecting the speed of travel of the vehicle, 11 a gear position sensor for detecting a gear position of the transmission 4, and 12 an accelerator sensor for detecting the amount or depth to which the accelerator pedal 8 is depressed. Output signals from these sensors are supplied to the electronic control system 1. The clutch 3 and the transmission 4 are associated with a clutch actuator 13 and a transmission actuator 14, respectively, for mechanically operating the clutch 3 and the transmission 4. The clutch and transmission actuators 13, 14 are controlled by the electronic control system 1 based on the output signals from the sensors 9 through 12 and an output signal from the selector lever 7.

Figure 5:
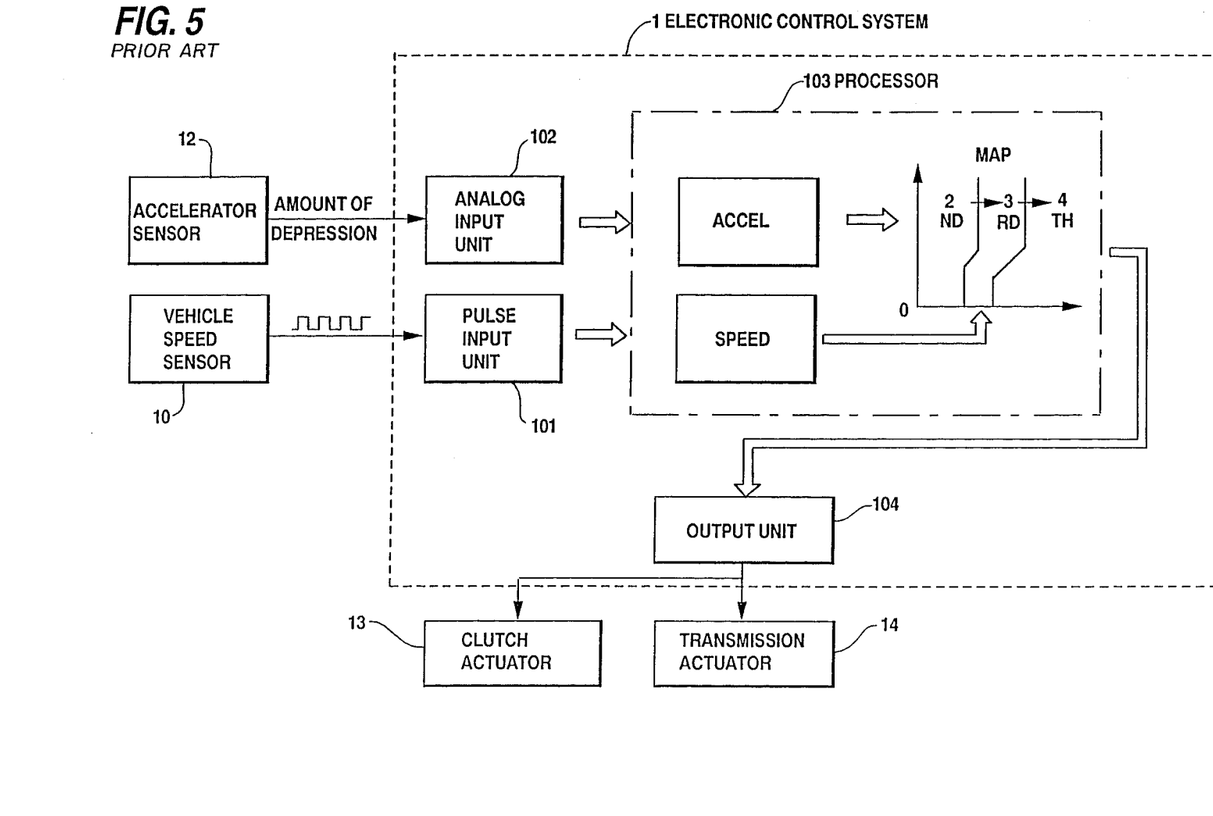
FIG. 5 is a functional block diagram explaining primary operation of the conventional electronic control system.

FIG. 5 shows in block form the electronic control system for explaining main operation thereof. The electronic control system 1 includes a pulse input unit 101 for counting output pulses from the vehicle speed sensor 10 and an analog input unit 102 for converting an analog output from the accelerator sensor 12 to a digital signal through A/D conversion. In a processor 103, a count from the pulse input unit 101 is put in a variable "SPEED", and a digital signal from the analog input unit 102 is put in a variable "ACCEL". The processor 103 searches a predetermined speed change map (MAP) for an optimum gear position based on "SPEED" and "ACCEL". The processor 103 then issues the optimum gear position to an output unit 104 which operates the clutch actuator 13 and the transmission actuator 14 for speed changing operation.

A processing sequence of the processor 103 will be described with reference to FIGS. 6(a) and 6(b). Variables used in this processing sequence are shown in FIG. 7.

Figures 6A, 6B:
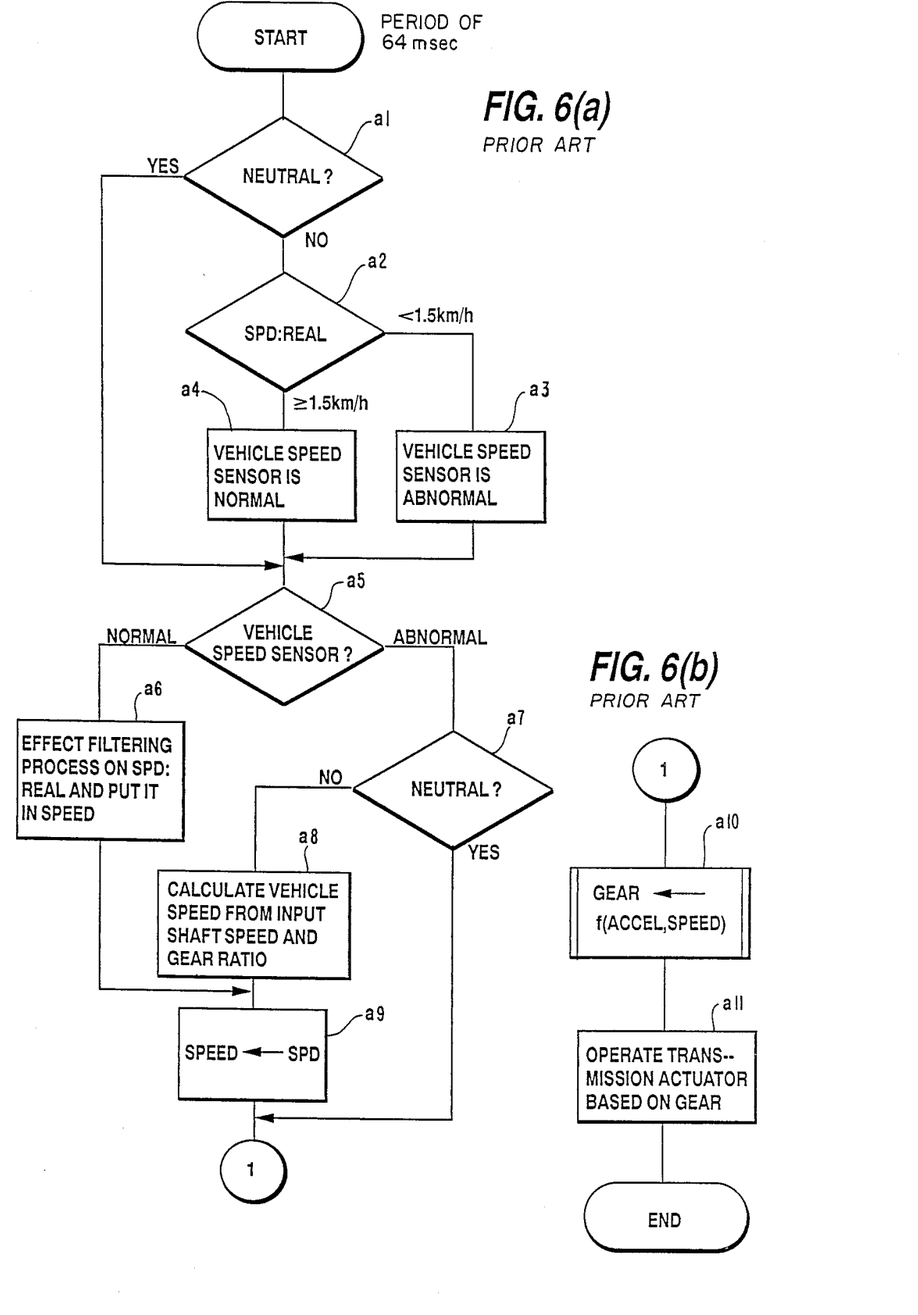
FIGS. 6(a) and 6(b) are a flowchart of a processing sequence of a processor shown in FIG. 5.
Figure 7:
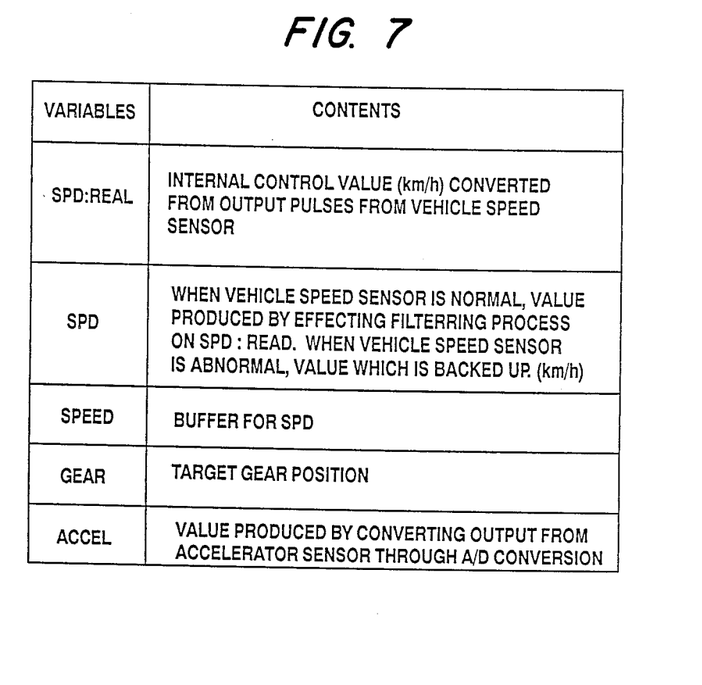
FIG. 7 is a diagram illustrating variables and their contents which are employed in the processing sequences.

A step $a_1$ in FIG. 6(a) determines whether the present gear position is a neutral gear position or not. If the present gear position is other than the neutral gear position, then control goes to a process for detecting an abnormality of the vehicle speed sensor in steps $a_2$ through $a_4$. In this detecting process, a step a, first determines a variable "SPD:REAL" is smaller than a preset value (1.5 km/h in this example). If smaller than 1.5 km/h, then the vehicle speed sensor is determined as being abnormal in a step $a_3$. If equal to or greater than 1.5 km/h, then the vehicle speed sensor is determined as being normal in a step $a_4$.

Then, control goes to a step $a_5$ to confirm the result of the above process for detecting an abnormality of the vehicle speed sensor. If the vehicle speed sensor is normal, then a variable "SPEED:REAL" is subjected to a filtering process and then put in a variable "SPD" in a step $a_6$. If the vehicle speed sensor is abnormal, then a step $a_7$ determines whether the gear position is the neutral position or not. If not the neutral position, control goes to a step $a_8$. In the step $a_8$, the variable "SPD:REAL" is not used, but the vehicle speed is calculated from the rotational speed of the input shaft of the transmission and the gear ratio thereof, and put in "SPD".

In a next step $a_9$, "SPD" obtained in the step $a_6$ or $a_8$ is put in the variable "SPEED". If the gear position is the neutral position in the step $a_7$, control does not go through the step $a_9$, and hence "SPEED" is retained as it is without being updated. In a step $a_{10}$, an optimum gear position is determined from the speed change map based on "SPEED" and "ACCEL", and put in a variable "GEAR". In a next step $a_{11}$, the value of "GEAR" is applied to the output unit 104 (FIG. 5) to operate the clutch actuator 13 and the transmission actuator 14.

In the above conventional electronic control system, when the vehicle speed sensor fails, if the gears are in any of gear positions other than the neutral gear position, it is possible to calculate the vehicle speed from the gear ratio and the input shaft rotational speed (step $a_8$ in FIG. 6). Moreover, the proportion of the time in which the gears are in the neutral position to the entire running time of the automobile is very small. In view of these considerations, any abnormality of the vehicle sensor while the gears are in the neutral position has not been detected in the conventional electronic control system (steps $a_1$ through $a_4$).

It has been found, however, that when the vehicle speed sensor fails while the gears are in the neutral gear position, the vehicle as it runs may become dangerous with the aforesaid processing sequence. This dangerous situation will be described with reference to FIG. 8, which shows the relationship between the vehicle speed and time when the vehicle is running.

It is assumed here that the vehicle sensor fails at a time $t_{10}$ after the selector lever is operated by the driver into a neutral gear position at a time $t_0$. The processing of the electronic control system 1 now goes from the step $a_1$ to the step $a_5$ to the step $a_6$ in FIG. 6. However, when the vehicle sensor fails, it does not issue vehicle speed pulses, and hence the variable "SPD:REAL" is "0". Therefore, "SPD" obtained in the step $a_6$ approaches "SPD:REAL" ($=0$) at a certain gradient based on the filtering process as indicated by the dot-and-dash line, and then becomes "0" at a time $t_{11}$. Thus, the electronic control system 1 determines that the vehicle is already at rest at the time $t_{11}$ regardless of the fact that the actual vehicle speed (represented by the solid line) is still high.

Thereafter, at a time $t_2$, when the driver shifts the selector lever into a drive position, the gears tend to be shifted into a second gear position irrespective of the fact that the actual vehicle speed a [km/h] is far in excess of a speed range (below b [km/h]) suitable for the second gear position. If the vehicle speed sensor were normal at this time, "SPD" would represent a [km/h], and the gears would not be shifted into the second gear position. However, since the vehicle speed sensor is abnormal, and hence "SPD"=0 [km/h] as described above, the gears are shifted into the second gear position inasmuch as this value of "SPD" is in the speed range suitable for the second gear position. As a consequence, the transmission 4 is caused to rotate excessively, and the engine is liable to overrun. If the engine overruns, no safety running of the vehicle is ensured, and the life of the driver may be endangered.

SUMMARY OF THE INVENTION

It is an object of the present invention to provide an electronic control system for controlling an automatic vehicle transmission to allow the vehicle to run safely after a vehicle speed sensor fails when the gears of the transmission are in a neutral gear position.

According to the present invention, there is provided an electronic control system for controlling an automatic transmission mounted on a vehicle and having gear position detecting means, based on at least vehicle speed data from a vehicle speed sensor, comprising: detecting means for detecting an abnormality of the vehicle speed sensor when the gear position of the transmission as detected by the gear position detecting means is a neutral gear position; memory means for storing, when the abnormality of the vehicle speed sensor is detected, vehicle speed data obtained from the vehicle speed sensor immediately before the abnormality of the vehicle speed sensor is detected; and gear position determining means for determining, when the abnormality of the vehicle speed sensor is detected, a gear position for the automatic transmission based on the vehicle speed data stored in said memory means for a predetermined period of time after the gear position is changed from the neutral gear position to another gear position.

With the above arrangement, if the vehicle speed sensor fails when the gears of the transmission are in the neutral gear position while the vehicle is running, the abnormality of the vehicle speed sensor is detected, and vehicle speed data immediately before the vehicle speed sensor becomes abnormal. For a predetermined period of time after the gears are shifted from the neutral gear position to another gear position, a gear position is determined based on the vehicle speed data stored in the memory means. Therefore, subsequent erroneous gear shifting operation is prevented to allow the vehicle to run safely.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
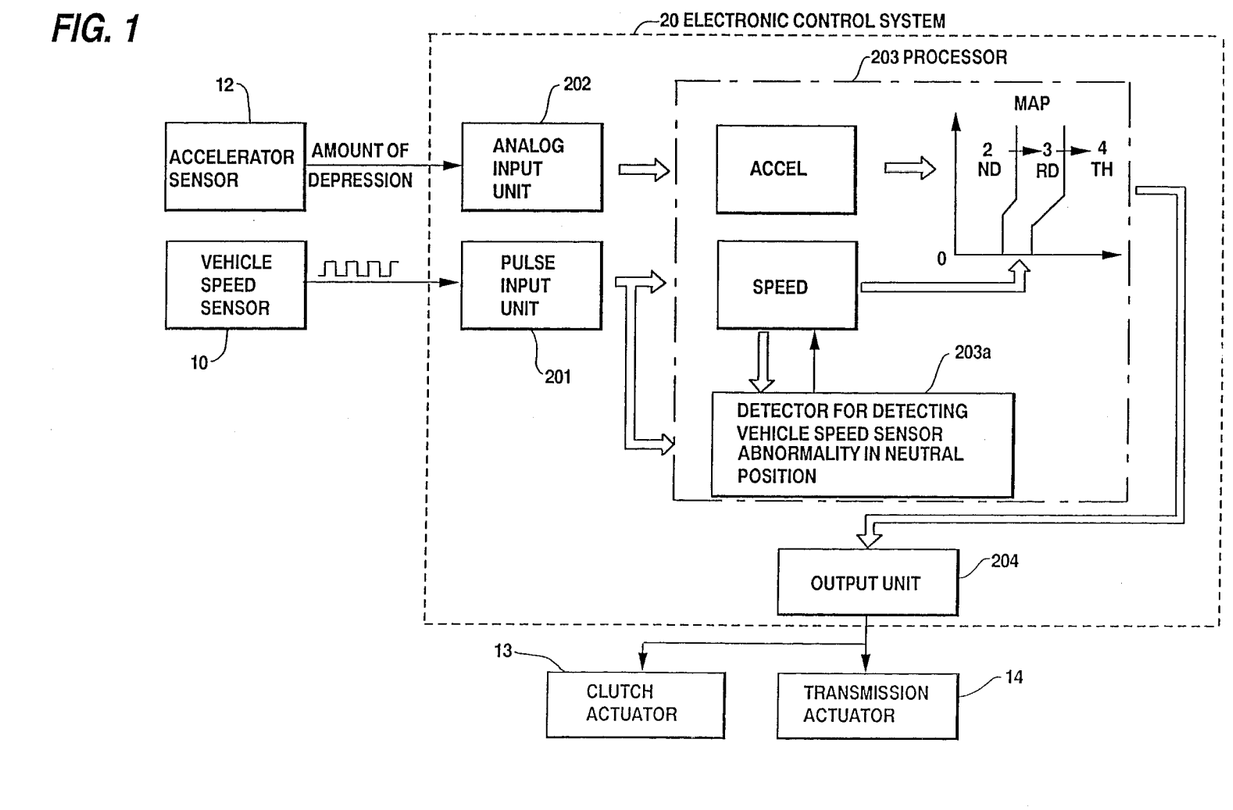
FIG. 1 a block diagram of an electronic control system according to an embodiment of the present invention; sequence of the electronic control system.

FIG. 1 shows an electronic control system 20 that can be incorporated in a vehicle such as an automobile for controlling an automatic vehicle transmission.

The electronic control system 20 includes a pulse input unit 201 for counting output pulses from a vehicle speed sensor 10 and an analog input unit 202 for converting an analog output from an accelerator sensor 12 to a digital signal through A/D conversion. In a processor 203, a count "SPD:REAL" from the pulse input unit 201 is put in a variable "SPEED", and a digital signal from the analog input unit 202 is put in a variable "ACCEL". The processor 203 searches a predetermined speed change map (MAP) for an optimum gear position based on "SPEED" and "ACCEL". In a neutral gear position, any abnormality of the vehicle speed sensor is detected by a vehicle speed sensor abnormality detector 203a according to the present invention. In the illustrated embodiment, the vehicle speed sensor is judged as being abnormal when an abrupt change in the number of output pulses from the vehicle speed sensor is detected based on the difference between the output "SPD:REAL" from the pulse input unit 201 and "SPEED" obtained immediately prior to "SPD:REAL".

When the vehicle speed sensor is determined as being abnormal, the value of "SPEED" is retained, but not updated while the transmission gears are in the neutral gear position and for a fixed period of time after the neutral gear position is selected. The processor 203 issues an optimum gear position thus determined to an output unit 204 which operates the clutch actuator 13 and the transmission actuator 14 for speed changing operation.

A processing sequence of the processor 203 will be described with reference to FIGS. 2(a) and 2(b). This processing sequence is effected at the period of 64 msec.

Figure 2A:
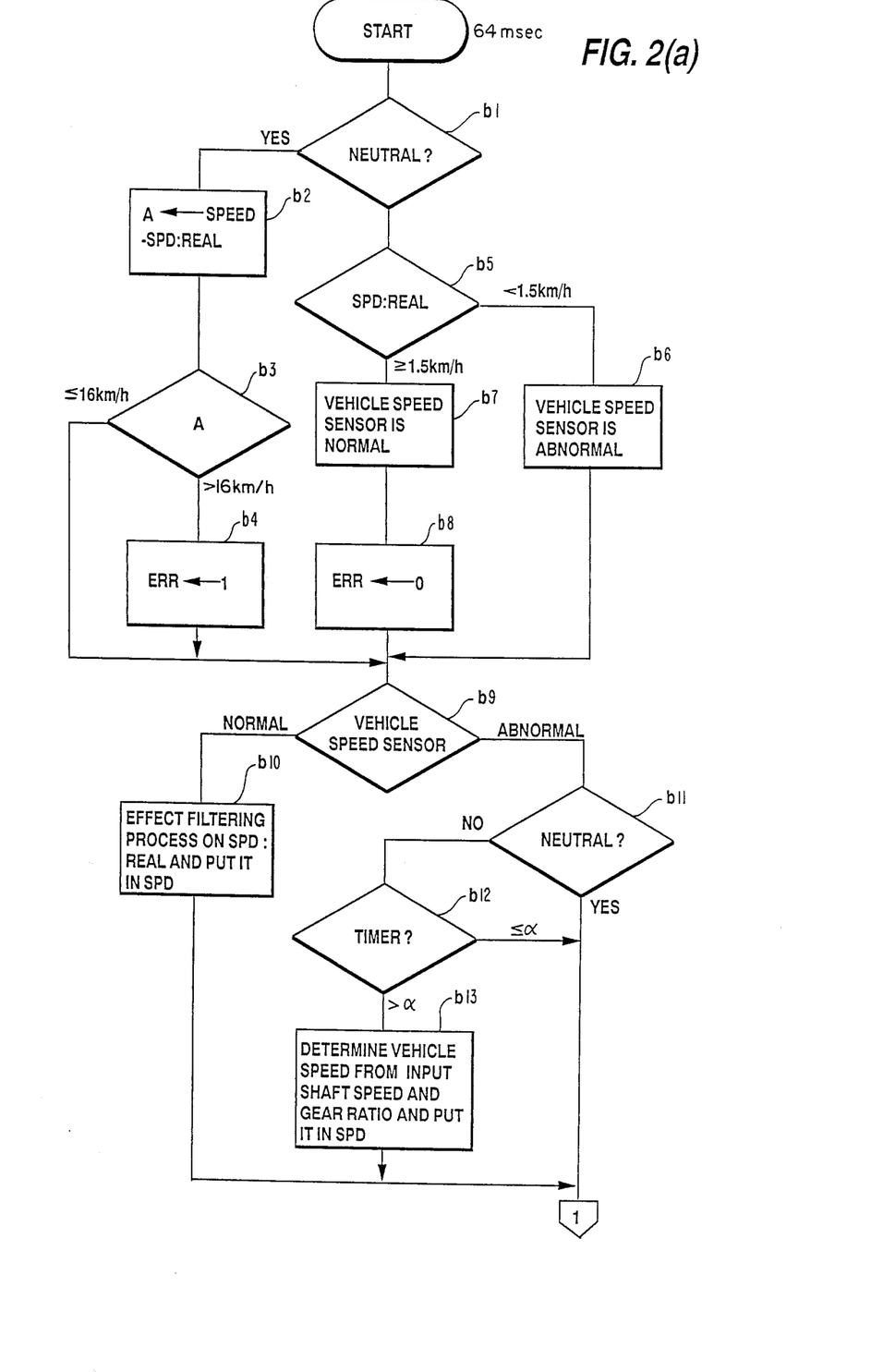
FIGS. 2(a) and 2(b) are a flowchart of a processing sequence of the control system.

In FIG. 2(a), a process from a step $b_1$ through a step $b_8$ serves to detect any abnormality of the vehicle speed sensor 10. First, a step $b_1$ determines whether the present gear position is neutral or not. If in the neutral position, then control goes to a step $b_2$. In the step $b_2$, "SPD:REAL" (the vehicle speed prior to being subjected to the filtering process) is subtracted from "SPEED" (the vehicle speed after being subjected to the filtering process), and the difference is put in A. A next step $b_3$ determines A exceeds a preset value (16 [km/h] in this embodiment) or not (i.e., whether a time-dependent change in the vehicle speed detected by the vehicle speed sensor is so rapid that it exceeds 16 [km/h]/64 msec. or not). If A >16 [km/h], then the vehicle speed sensor is determined as being abnormal, and then "ERR" is set to "1" in a step $b_4$. The processing from the step $b_1$ through the step $b_4$ can determine any abnormality of the vehicle speed sensor when the gears are in the neutral position.

If not in the neutral position in the step $b_1$, then the same processing as the conventional processing (indicated in FIG. 6(a) as the steps $a_2$, through $a_4$) is carried out in steps $b_5$ through $b_7$ to detect an abnormality of the vehicle speed sensor. When the vehicle speed sensor is normal (step $b_7$), "0" is put in "ERR" in a step $b_8$.

The processing from a step $b_9$ through a step $b_{17}$ serves to determine the value of "SPEED" used for determining an optimum gear position in a steps $b_{19}$, described later on.

A step $b_9$ confirms whether the vehicle speed sensor is detected as being abnormal or not in the steps $b_5$ through $b_7$. If the vehicle speed sensor is normal, control goes to a step $b_{10}$ in which the variable "SPD:REAL" is subjected to a filtering process and then put in "SPD". If the vehicle speed sensor is abnormal, then a step $b_{11}$ determines if the gear position is neutral or not. If not neutral, a step $b_{12}$ checks a timer, and if the timer exceeds a preset value $\alpha$, control proceeds to a step $b_{13}$. This timer is incremented at the period of 64 msec. after the gears are released from the neutral position. In the step $b_{13}$, the vehicle speed is calculated from the rotational speed of the input shaft and the gear ratio of the transmission, and put in "SPD". Therefore, according to the processing from the step $b_9$ through the step $b_{13}$, the speed determined dependent on whether the vehicle speed sensor is normal or abnormal as detected other than when in the neutral position is put in "SPD" except in a period of time in which the gear position is neutral after the vehicle speed sensor is detected as abnormal and in a fixed period of time ($\alpha \times 64$ msec.) after the gears are released from the neutral position.

Figure 2B:
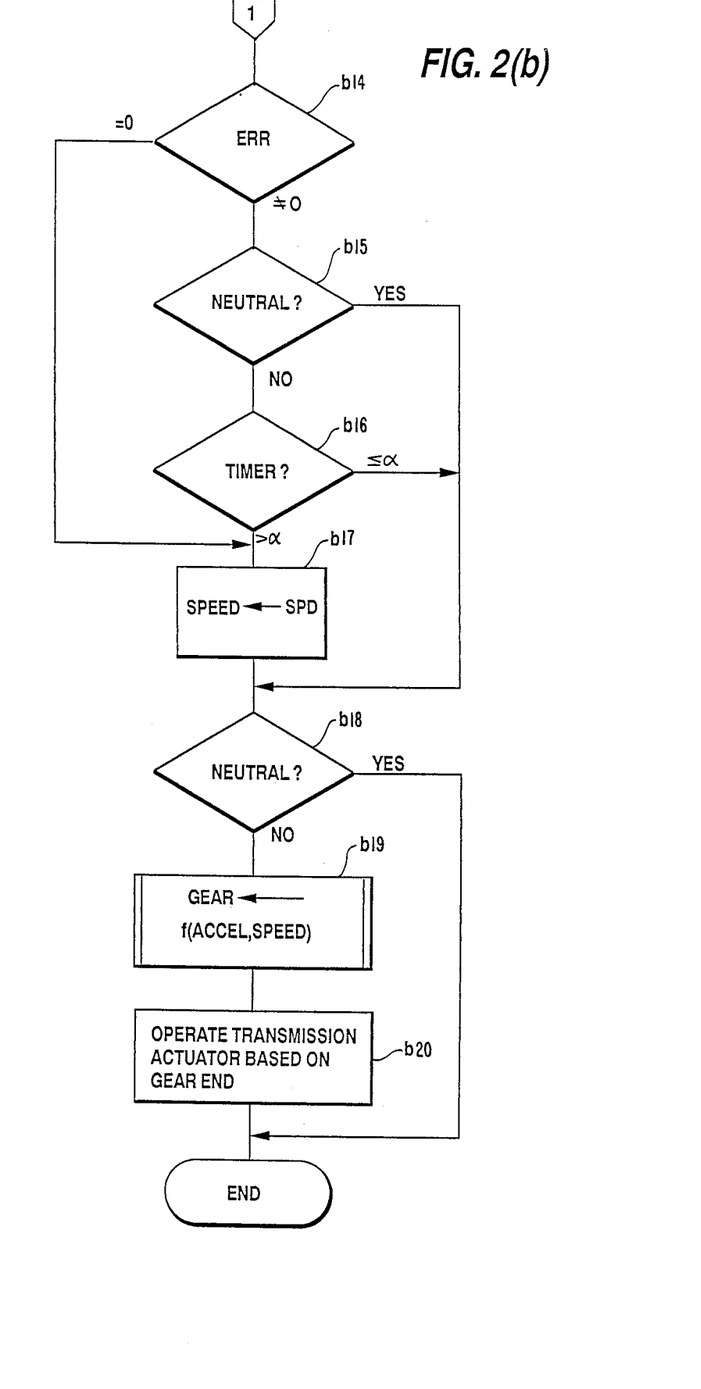

Then, control goes to a step $b_{14}$. in FIG. 2(b) which confirms the value of "ERR" which has been put in the step $b_4$, $b_8$. If "ERR"=0 (when the vehicle speed sensor is normal or when the vehicle speed sensor is abnormal with the gears shifted and $\alpha>0$), then control goes to a step $b_{17}$ in which "SPD" obtained in the step $b_{10}$ or $b_{13}$ is put in "SPEED". If "ERR"≠0 (when the vehicle speed sensor is abnormal in the neutral position), then control goes to a step $b_{17}$, only when the gear position is not neutral and the timer exceeds $\alpha$ in steps $b_{15}$, $b_{16}$. If the gear position is neutral in the step $b_{15}$, or if the timer is equal to or smaller than $\alpha$ in the step $b_{16}$, then the step $b_{17}$, is not executed. Therefore, according to the processing from the steps $b_{14}$ through $b_{17}$, if the vehicle speed sensor is detected as being abnormal in the neutral position, the value "SPEED" is retained but not updated in a subsequent period of time in which the gear position is neutral and in a fixed period of time ($\alpha \times 64$ msec.) after the gears are released from the neutral position. In other periods of time, the value of "SPEED" is updated from time to time by "SPD" obtained in the steps $b_{10}$, $b_{13}$.

Figure 3:
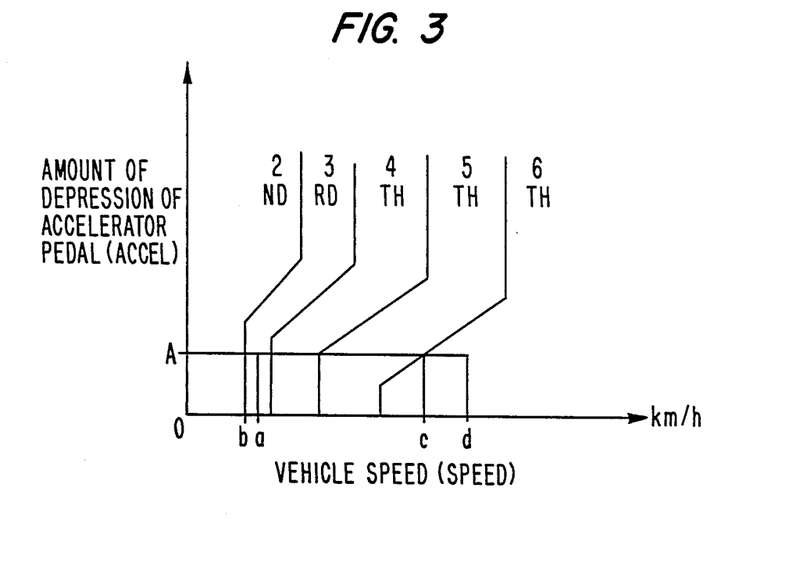
FIG. 3 a diagram showing by way of example a speed change map in a step $b_{19}$ shown in FIG. 2(b)

When "SPEED" is determined, a step $b_{18}$ determines whether the gear position is neutral or not. If not neutral, then control goes to a step $b_{19}$ in which an optimum gear position is determined from the speed change map (gear position determining map) shown in FIG. 3 by using as parameters "ACCEL" (the amount of depression of the accelerator pedal) and "SPEED" (vehicle speed), and the optimum gear position is put in "GEAR". Thereafter, control goes to a step $b_{20}$ in which the value of "GEAR" is given to the output unit 204 (FIG. 1) to operate the transmission actuator 14. If the gear position is neutral in the step $b_{18}$, the gear position is not changed and no gear shifting is effected.

Figure 8:
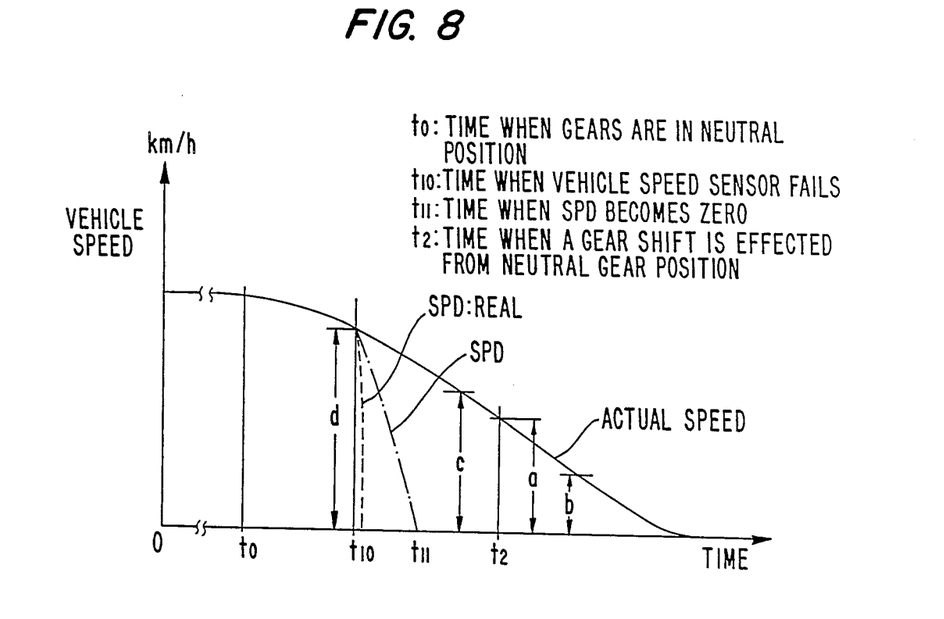
FIG. 8 is a diagram showing the relationship between vehicle speed and time when a vehicle speed sensor fails in a neutral gear position on the vehicle incorporating the conventional electronic control system.

An example of running pattern of the vehicle or automobile which incorporates the electronic control system 20 will be described with reference to FIG. 8. It is assumed in FIG. 8 that the driver shifts the gears into the neutral position at a time $t_0$ and the vehicle speed sensor fails at a time $t_{10}$.

If the vehicle speed sensor fails at the time $t_{10}$, its failure or abnormality is detected when the amount of change ("SPEED"- "SPD:REAL") in the vehicle speed per 64 msec. exceeds 16 [km/h] (steps $b_1$, $b_2$, $b_3$, $b_4$), and "SPEED" retains a vehicle speed d [km/h] immediately prior to the vehicle speed sensor abnormality (steps $b_9$, $b_{10}$, $b_{14}$, $b_{15}$, $b_{18}$). At this time, since "SPD:REAL" is 0, "SPD" is also 0, and the vehicle is recognized as being at rest by confirming "SPD" only.

It is assumed that the actual vehicle speed is lowered to $a16$ [km/h] at a time $t_2$, and the driver operates the selector lever at this time into a drive position (e.g., D range). Then, the gear position is determined from "SPEED" and "ACCEL" in the step $b_{19}$. If the values a~d of "SPEED" with "ACCEL" set to A in the speed change map (FIG. 3) used at this time correspond respectively to the vehicle speeds a~d in FIG. 8, then since "SPEED" retains $d16$ [km/h] at the time $t_2$, the optimum gear position is determined as a sixth gear position (6TII). Inasmuch as the sixth gear position is suitable enough for the actual vehicle speed $a16$ [km/h], the transmission is protected from seizure and the engine is prevented from overrunning.

After the gears have been shifted in this manner, the vehicle speed is backed up by the gear ratio and the input shaft rotational speed upon elapse of a fixed period of time ($\alpha \times 64$ msec.) from the gear shifting, and is put in "SPEED" (steps $b_1$, $b_5$, $b_6$, $b_9$, $b_{11}$, $b_{12}$, $b_{13}$, $b_{14}$, $b_{15}$, $b_{16}$, $b_{17}$) If "SPEED" thus obtained is 116 [km/h] and "ACCEL" is A, because it can be seen from the speed change map (FIG. 3) that the vehicle can run in the third gear position (3RD), the optimum gear position is determined as the third gear position (step $b_{19}$), and a speed change is effected (step $b_{20}$). Thereafter, a speed change command is given based on backed-up "SPEED".

With the present embodiment, as described above, abnormality of the vehicle speed sensor can be detected by detecting an abrupt change in the output from the vehicle speed sensor when the gears are in the neutral position while the vehicle is running. Therefore, abnormality of the vehicle speed sensor can be detected when the vehicle speed sensor fails in any of the gear positions if the vehicle is running. Moreover, "SPEED" is not updated during a period of time in which the gear position is neutral (and a fixed period of time after the gears are released from the neutral position) while a vehicle speed sensor failure is being detected. Consequently, any subsequent dangerous erroneous gear shifting operation is prevented to avoid troubles which would fatally affect the vehicle running capability, such as gear seizure of the transmission, destruction of the clutch disc, and engine overrunning. The processing sequence of the invention can be realized by a simple algorithm without affecting a conventional backup process.

The process of detecting an abnormality of the vehicle speed sensor while the gears are in the neutral position is not limited to the sequence from the step $b_1$ through $b_4$.

Although a certain preferred embodiment has been shown and described, it should be understood that many changes and modifications ma be made therein

What I claim is:

1. An electronic control system for controlling an automatic transmission mounted on a vehicle and having gear position detecting means, based on at least vehicle speed data from a vehicle speed sensor, comprising:

detecting means for detecting an abnormality of the vehicle speed sensor when the gear position of the transmission as detected by the gear position detecting means is a neutral gear position;

memory means for storing. when the abnormality of the vehicle speed sensor is detected, vehicle speed data obtained from the vehicle speed sensor immediately before the abnormality of the vehicle speed sensor is detected; and gear position determining means for determining, when the abnormality of the vehicle speed sensor is detected, a gear position for the automatic transmission based on the vehicle speed data stored in said memory means for a predetermined period of time after the gear position is changed from the neutral gear position to another gear position.

2. An electronic control system according to claim 1, wherein said detecting means includes means for detecting the abnormality of the vehicle speed sensor when an amount of change of the vehicle speed data from the vehicle speed sensor within a given period of time exceeds a predetermined value.

* * * * *

UNITED STATES PATENT AND TRADEMARK OFFICE
CERTIFICATE OF CORRECTION

PATENT NO. : 4,843,915

DATED : July 4, 1989

INVENTOR(S) : Sugimura et al.

It is certified that error appears in the above-identified patent and that said Letters Patent is hereby corrected as shown below:

Col. 1, line 46, "put in" s/b --entered as--;
line 48, "is put in" s/b --entered as--;
line 64, "a," s/b --$a_2$--.

Col. 2, line 7, "put in" s/b --entered as--;
line 14, "put in" s/b --entered as--;
line 17, "put in" s/b --substituted for--;
line 22, "put in" s/b --entered as--;
line 63, "a" s/b --$\underline{a}$--;
line 64, "b" s/b --$\underline{b}$--;
line 66, "a" s/b --$\underline{a}$--.

Col. 3, line 41, after "data" insert --acquired--;
line 42, after "abnormal" insert --, is utilized.--;
line 65, after "ing" insert --a conventional--.

UNITED STATES PATENT AND TRADEMARK OFFICE
CERTIFICATE OF CORRECTION

PATENT NO.    : 4,843,915
DATED         : July 4, 1989
INVENTOR(S)   : Sugimura et al.

It is certified that error appears in the above-identified patent and that said Letters Patent is hereby corrected as shown below:

Col. 4,  line 22, "put in" s/b --entered as--;
         line 23, "put in" s/b --entered as--;
         line 58, "put in" s/b --utilized as variable--;
         line 59, after "determines" insert --whether--.

Col. 5,  line 3, "$a_2$," s/b --$a_2$--;
         line 9, "steps" s/b --step--;
         line 16, "put in" s/b --utilized as the variable--;
         line 24, "put in" s/b --substituted for--;
         line 26, "the speed" s/b --vehicle speed is--;
         line 29, "is put in" s/b --. The vehicle speed is substituted as the variable--;
         line 40, "put in" s/b --entered as--;

UNITED STATES PATENT AND TRADEMARK OFFICE
CERTIFICATE OF CORRECTION

Page 3 of 4

PATENT NO. : 4,843,915
DATED : July 4, 1989
INVENTOR(S) : Sugimura et al.

It is certified that error appears in the above-identified patent and that said Letters Patent is hereby corrected as shown below:

line 41, delete "in the neutral position";
              line 42, "$b_{17}$" s/b --b--;
              line 46, "$b_{17}$," s/b --$b_{17}$--, after "executed" insert --and control goes to step $b_{18}$.--;
              line 63, "put in" s/b --entered as a variable--.

Col. 6,    line 11, "d" s/b --$\underline{d}$--;
              line 17, "a16" s/b --$\underline{a}$--;
              line 24, "d16" s/b --$\underline{d}$--;
              line 27, "a16" s/b --$\underline{a}$--;
              lines 33 and 34, "is put in" s/b --entered as--;
              line 68, "ma" s/b --may--.

Col. 7,    line 5, delete "and";
              line 6, after "ing" insert --a vehicle speed

UNITED STATES PATENT AND TRADEMARK OFFICE
CERTIFICATE OF CORRECTION

PATENT NO. : 4,843,915

DATED : July 4, 1989

INVENTOR(S) : Sugimura et al.

It is certified that error appears in the above-identified patent and that said Letters Patent is hereby corrected as shown below:

>
> sensor and--, after "means" insert --for
> detecting a gear position--;
> line 7, "a" s/b --the--;
> line 14, "storing." s/b --storing,--.

Signed and Sealed this

Thirty-first Day of December, 1991

Attest:

HARRY F. MANBECK, JR.

*Attesting Officer*    *Commissioner of Patents and Trademarks*